United States Patent [19]

Kast

[11] Patent Number: 5,159,808
[45] Date of Patent: Nov. 3, 1992

[54] GAS TURBINE ENGINE FUEL AND HYDRAULIC FLUID PUMPING SYSTEM

[75] Inventor: Howard B. Kast, Fairfield, Ohio

[73] Assignee: General Electric Company, Cincinnati, Ohio

[21] Appl. No.: 550,340

[22] Filed: Jul. 9, 1990

[51] Int. Cl.⁵ .................................. F02C 7/236
[52] U.S. Cl. .......................... 60/39.091; 60/734
[58] Field of Search ............. 60/734, 39.06, 39.091; 123/198 D, 359

[56] References Cited

U.S. PATENT DOCUMENTS 3,369,491 2/1968 Hoffer.
4,291,532 9/1981 Robinson .................... 60/39.06
4,546,745 10/1985 Brotherston ................ 123/198 D Primary Examiner—Richard A. Bertsch
Assistant Examiner—Timothy S. Thorpe
Attorney, Agent, or Firm—Jerome C. Squillaro; Bernard E. Shay

[57] ABSTRACT

An arrangement for a main fuel pump, a backup fuel pump, a main hydraulic pump, and a backup hydraulic pump, typically for a gas turbine engine in an aircraft, includes an isolated fuel and hydraulic fluid system and a backup pumping arrangement employing two mechanically-coupled gear-type reversible pump-motors and appropriate control valves.

5 Claims, 3 Drawing Sheets

GAS TURBINE ENGINE FUEL AND HYDRAULIC FLUID PUMPING SYSTEM

FIELD OF THE INVENTION

This invention relates to aircraft gas turbine engine fuel and hydraulic fluid pumping systems with backup capability.

BACKGROUND OF THE INVENTION

As is well known in the gas turbine engine art, it is typical for an aircraft fuel pumping system to utilize one or more centrifugal fuel pumps and, for starting, a supplementary high-pressure positive displacement pump for providing pressure that a properly sized centrifugal pump cannot supply. The problem with this design is that it is relatively bulky, heavy, and mechanically complex. There has been a continuing search in the art for relatively lightweight and versatile arrangements for providing the starting pressurized fuel.

Heretofore, a separate problem in such situations is that the engine itself typically has several control actuation loops and actuators, such as engine nozzle actuators, compressor variable geometry vane actuators, or other critical actuators that are essential to engine operation. Frequently, at least one of these loops and/or actuators employs a hydraulic fluid other than the fuel. Just as fuel pumps can fail, so can hydraulic pumps.

Thus, it is desirable to provide a simple reliable backup capability for the fuel pump and the hydraulic pump that adds little bulk or weight to the base system. Nevertheless, it is necessary to keep the respective fluid circuits for the fuel and the hydraulic fluid isolated from each other.

SUMMARY OF THE INVENTION

According to the invention, both of these problems are solved by a fuel and hydraulic fluid pumping system, hereinafter referred to as a dual fluid pumping system, providing a fluid circuit arrangement that is lightweight, simple and maintains the isolation of the respective fluid circuits wherein each fluid circuit includes means for powering a second pump in the other fluid circuit.

More specifically the preferred embodiment provides a dual fluid pumping system according to the invention having first and second sources of the respective fuel and hydraulic fluids, first engine gearbox driven means for pressurizing the fuel including a first path for leading the pressurized fuel to the combustion apparatus, and a second means for pressurizing the fuel while it is in the first path and while the hydraulic fluid has a pressure in a preselected range. The invention further includes a first engine driven means for pressurizing the hydraulic fluid and a second means for pressurizing the hydraulic fluid whenever the hydraulic fluid pressure falls below the preselected hydraulic fluid pressure range and while the fuel pressure lies within a preselected fuel pressure range. The embodiment further provides a means to power the second means for pressurizing each respective fluid by the first pressurizing means in the other fluid's circuit.

A specific feature of the preferred embodiment of the invention provides that both of the second pressurizing means are reversible pump-motors mechanically coupled to each other, each having a pump operating mode and a motor operating mode.

BRIEF DESCRIPTION OF THE DRAWING

Further features and advantages of the invention, as covered by the appended claims, will become apparent from the following detailed description of the invention, or may be acquired from the practice thereof, according to the preferred embodiment illustrated in the accompanying drawings described below.

DETAILED DESCRIPTION

Figure 1:
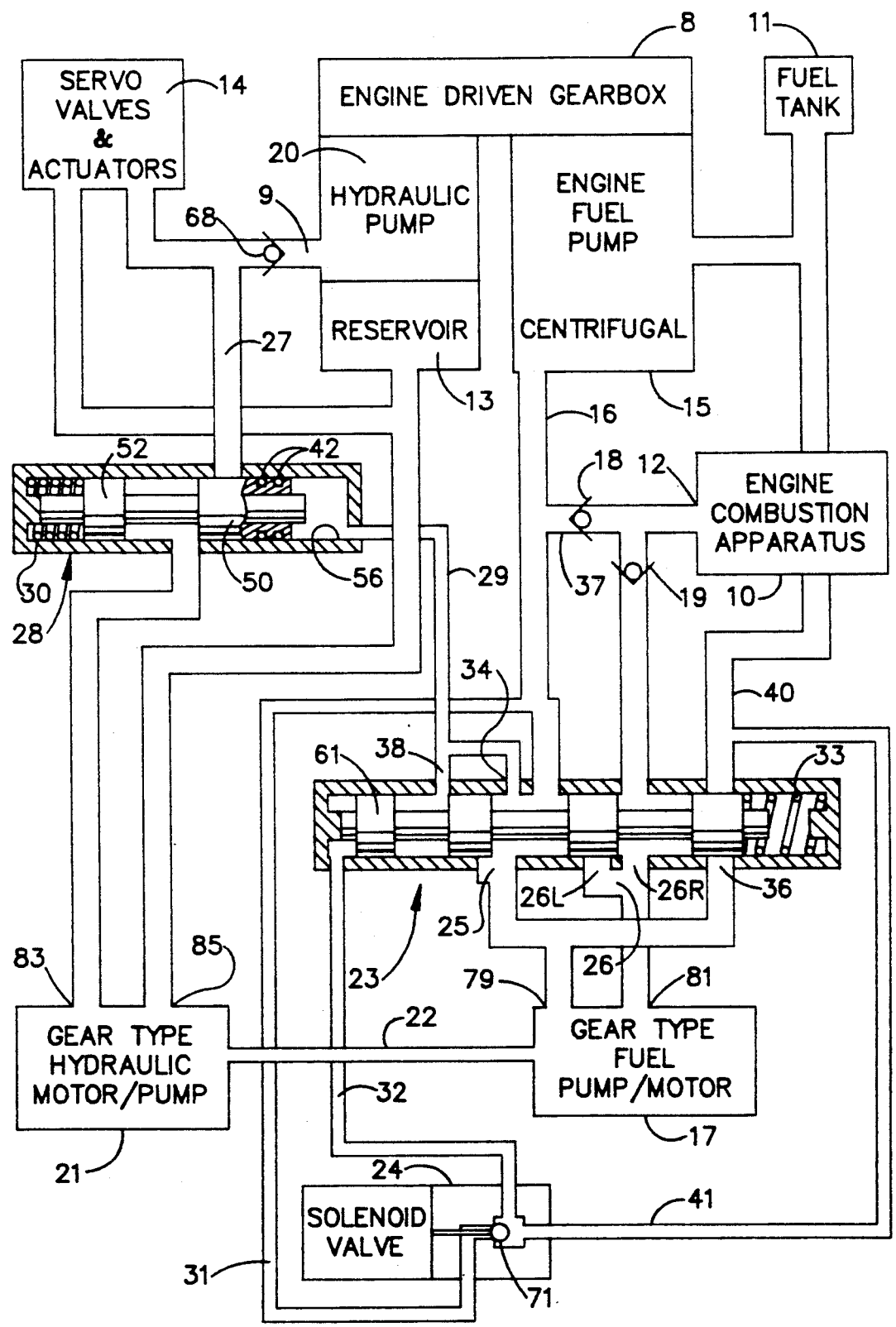
FIG. 1 is a partially pictorial and partially block diagram of the preferred embodiment in its normal mode of operation according to the present invention.

The invention as depicted in FIG. 1 schematically, in block diagram format, shows the preferred embodiment of the dual fluid pumping system of the present invention in its normal mode of operation. Fuel is pumped by a centrifugal engine fuel pump 15 from a first fluid source, fuel tank 11, through fuel flow path 16 past fuel pump check valve 18 to an engine combustor inlet 12, which in turn leads to a gas turbine engine combustion apparatus 10 which includes injectors and a combustion chamber, all not shown, as they are conventional for use in the engine. Note that fluid flow and direction within a fluid flow path is depicted by a solid line and arrow. Signal lines used to transmit fluid pressure for valve actuation purposes are shown empty but are distinguished from flow paths by their narrower width.

In the same system, a hydraulic fluid, e.g., a hydraulic oil, is pumped by a hydraulic pump 20 from a second fluid source, hydraulic fluid reservoir 13, through hydraulic fluid flow path 27 past hydraulic check valve 68 to at least one servo valve 14, which in turn leads to at least one set of actuators (not shown) for the engine itself, e.g., nozzle actuators, or compressor variable geometry vane actuators. Both the fuel pump 15 and the hydraulic pump 20 are driven by the engine gearbox 8.

There are four devices in the drawing which can serve as pumps. For convenience hereinafter the following references will be made. Fuel pump 15 is a first means for pressurizing fuel, preferably gear type fuel pump-motor 1 will be occasionally referred to as the second means for pressurizing fuel, hydraulic pump 20 is occasionally referred to as the first means for pressurizing the hydraulic fluid, and hydraulic pump-motor 21 may be referred to as a second means for pressurizing the hydraulic fluid.

Pump-motors are mechanisms which, when operated in the pump mode, pressurize fluid and pump it in a first direction when mechanical power, usually in the form of shaft horsepower, is supplied to the mechanism. When the mechanism is operated in the motor mode, pressurized fluid is flowed through the mechanism in a direction usually opposite to the first direction and shaft horsepower is supplied by the mechanism, usually, through the same shaft which is used to supply shaft horsepower in the pump mode. Such pump-motors are well known in the art.

The different fluids, fuel and hydraulic fluid, flow through isolated flow paths 16 and 27 respectively. The fuel is drawn from the fuel tank 11 by the first means for pressurizing fuel, engine fuel pump 15, and delivered through fuel flow path 16 to engine combustor inlet 12, and then to the combustion apparatus 10. Associated with fuel flow path 16 is the second means for pressurizing fuel, fuel pump-motor 17, which may be used, under certain conditions, to further pressurize the fuel while it is still in fuel flow path 16 as depicted in FIG. 2.

Hydraulic pump-motor 21 is a reversible gear-type pump motor which is coupled to the like reversible gear-type fuel pump-motor 17 by a mechanical drive connection, such as a shaft, 22. Hydraulic pump-motor 21 and drive shaft 22 comprise means for providing at least part of the motive power for fuel pump-motor 17, when the hydraulic fluid pressure is in a preselected range.

Interposed in fuel flow path 16 is fuel slide valve 23, which is responsive to a condition-responsive controller, solenoid valve 24. When the hydraulic fluid pressure is above a predetermined value, fuel slide valve 23 has ports 25 and 26 in the portions of fuel flow path 16, which port to and from fuel pump-motor 17 respectively when it is operated in a pump mode as illustrated in FIG. 2.

Figure 2:
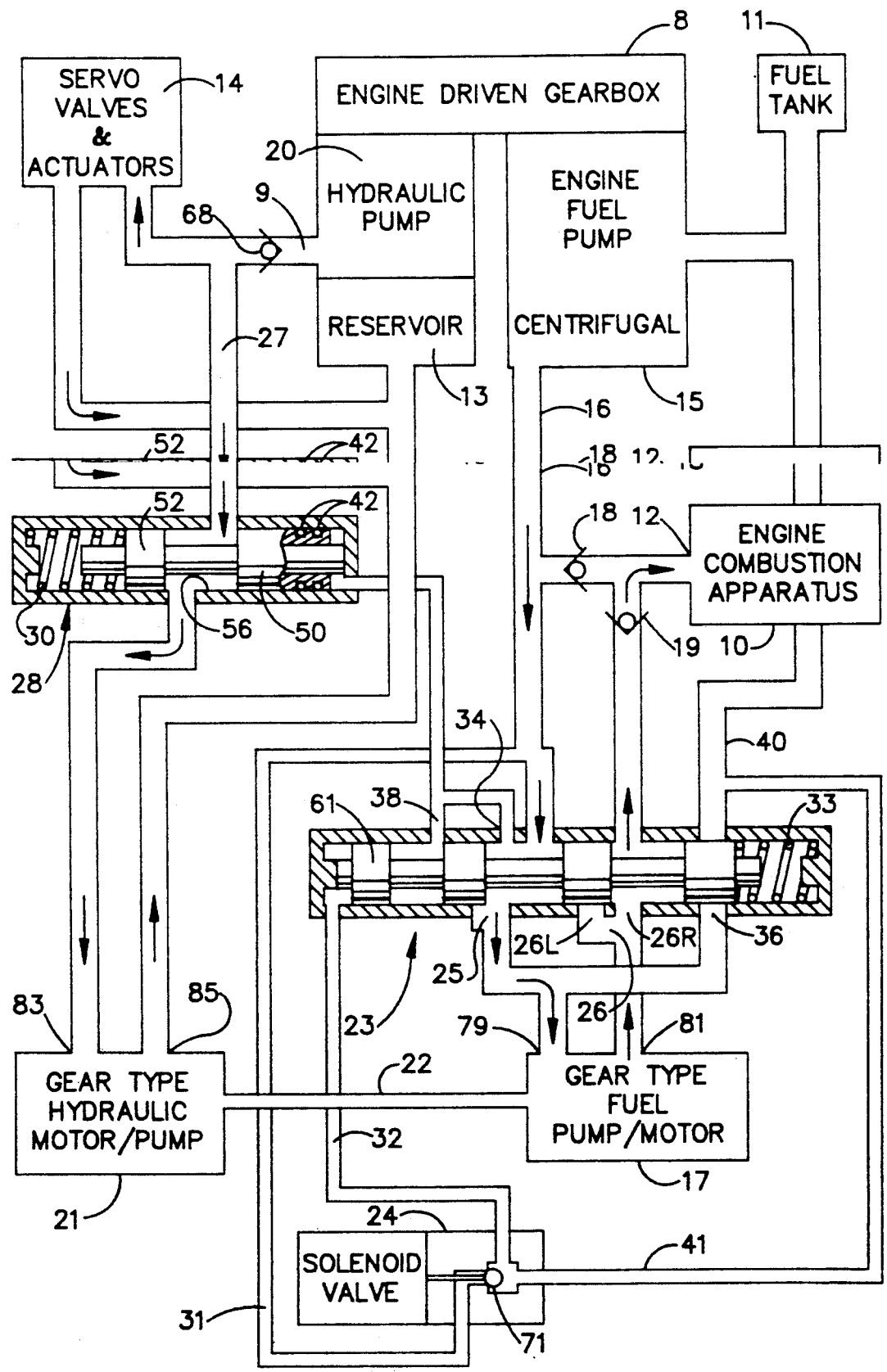
FIG. 2 is a partially pictorial and partially block diagram of the preferred embodiment in its fuel pump start-up or fuel pump backup mode of operation according to the present invention.

Interposed in hydraulic flow path 27, from the hydraulic pump 20 to hydraulic pump-motor 21, is hydraulic slide valve 28, which is biased by hydraulic valve biasing spring 30 to be normally open at engine start-up as shown in FIG. 2 and is adjusted toward a closed condition as the engine gains speed and the pressure from the centrifugal engine fuel pump 15 rises. To this end, fuel pressure is transmitted from the discharge of fuel pump 15 to hydraulic slide valve 28 via hydraulic valve actuating line 29 where the force due to the fuel pressure acting on hydraulic valve spool 52 produces an actuating force which opposes the bias supplied by hydraulic valve biasing spring 30. The components of the pumping system are sized so that, at normal engine operating speeds, hydraulic fluid valve 28 will be fully closed as illustrated in FIG. 1.

Hydraulic fluid valve 28 accommodates both fuel and hydraulic fluid within its bore 56 and incorporates a hydraulic valve spool 52. The right land 50 of hydraulic valve spool 52 is shown with two O ring type seals 42 circumferentially disposed about the spool in sealing engagement with bore 56 to keep the two fluids isolated from each other. In an alternate embodiment the valve 28 could be lengthened and means provided to vent overboard, from the valve 28, the fluids that may accumulate in the space between the two seals.

The preferred embodiment provides for having engine fuel pump 15 and hydraulic pump 20 powered mechanically by shafts from the engine. Alternate embodiments contemplate having one or both driven by electric motors or hydraulic motors.

In the engine's normal operating mode, when the engine centrifugal fuel pump 15 is providing all the required fuel flow such as during normal cruise conditions, solenoid valve 24 ports fuel from a low pressure engine fuel pump inlet line 40 via low pressure signal line 41. In an alternative embodiment, the function provided by the solenoid valve 24, could be provided by a slide valve (not shown). The slide valve would be responsive to hydraulic pump 20 and fuel pump 15 pressures such that if the force due to fuel pressure exceeded the force due to hydraulic pressure, the slide valve would port pressurized engine fuel from fuel pump 15 to fuel valve actuating line 32.

Figure 3:
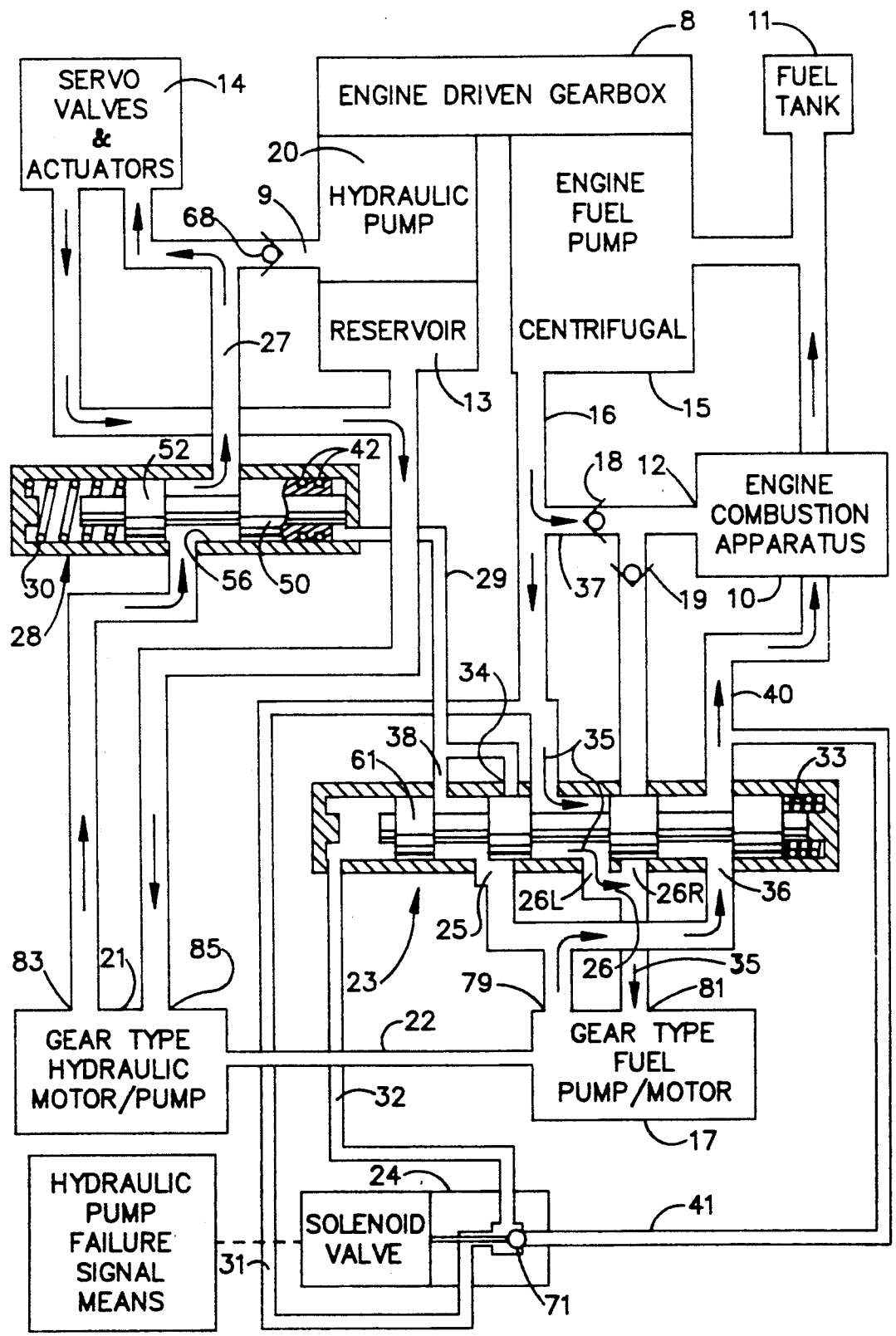
FIG. 3 is a partially pictorial and partially block diagram of the preferred embodiment in its hydraulic pump backup mode of operation according to the present invention.

A solenoid valve 24 is provided to sense and respond to a hydraulic pump failure signal generated by a pump failure signal generating means 59 (e.g., the hydraulic pressure falls below a predetermined hydraulic pump failure value) by porting the pressurized engine fuel from a high pressure signal line 31, to the left side of fuel slide valve 23 via fuel valve actuating line 32. Such a hydraulic pump 20 failure mode is depicted in FIG. 3 and described in more detail further on herein. The fuels pressure acts on a fuel valve spool 61 thereby opposing the biasing force of fuel valve biasing spring 33 and overpowering it in one step. Ball 71 within solenoid valve 24 indicates whether high pressure signal line 31 or a low pressure signal line 41 is closed off thereby putting fuel valve actuating line 32 in fluid pressure communication with the other signal line. Ball 71, when shown in its left most position as in FIGS. 1 and 2, indicates that high pressure signal line 31 is closed off and when shown at its right most position, as shown in FIG. 3, indicates that low pressure signal line 41 is closed off.

Signal lines 29, 31, 32, and 41 transmit pressure for valve actuation purposes and therefore are smaller than the fluid flow paths 16 and 27 which, as one of their function, transmit power. The preferred embodiment contemplates inside diameters of approximately ⅛ of an inch for the signal lines and 1½ inches for the signal lines and fluid circuits respectively.

Having thus explained the hydraulic fluid and fuel circuits, particularly with respect to its normal operating mode as depicted in FIG. 1, attention is called to the control and operation of the circuits. Referring to FIG. 1., ports 25, 26 and 34 of fuel slide valve 23 are positioned in the normal operating mode position so that fuel passes to fuel-pump motor 17, which is in an inactive or non-rotating mode. Due to leakage through fuel pump-motor 17, pressure on both sides of check valve 19 are equal and check valve 19 remains closed. When fuel spool 61 is in this position, fuel pressure, which is equal to engine fuel pump 15 discharge pressure, is transmitted to hydraulic slide valve 28 through hydraulic valve actuating line 29. This maintains hydraulic slide valve 28 in the closed so that no hydraulic fluid is ported to hydraulic motor-pump 21.

FIG. 2 illustrates two modes of operation, the engine start-up mode and the fuel pump backup mode, of the preferred embodiment which employ fuel pump-motor 17 in its fuel pumping mode. During the start-up mode, fuel pump-motor 17 provides a fuel pressure increase required for starting while in the backup mode it provides all of the fuel pumping if engine fuel pump 15 fails or if its capacity is diminished. In the illustrated embodiment, fuel pump-motor 17 is disposed serially in fuel flow path 16, and receives fuel from engine fuel pump 15 and directs it past fuel return check valve 19 toward engine combustor inlet 12. The hydraulic fluid is drawn from the hydraulic fluid reservoir 13 by the first means for pressurizing hydraulic fluid, hydraulic pump 20, and delivered to at least one servo valve 14. FIG. 2 depicts a mode of operation where hydraulic slide valve 28 is configured to operate the second means for pressurizing hydraulic fluid, hydraulic pump-motor 21, as a motor to drive fuel pump-motor 17 as a pump.

Referring to FIG. 3., ports 25, 26 and 34 of fuel slide valve 23 are spaced so that, when fuel spool 61 is slid to the right, the portion of fuel flow path 16 that was previously upstream to fuel pump-motor 17 is closed, a relatively high-pressure flow path 35 is opened from engine fuel pump 15 to the previously downstream side of fuel pump-motor 17, reversing its role to that of a motor. The new exhaust flow from fuel pump-motor 17 is directed through newly-opened flow path 36 toward fuel tank 11. Further, hydraulic valve actuating line 29 is depressurized because its associated portion of fuel flow path 16 is closed at its traverse of fuel slide valve 23 and path 38 is opened via slide valve port 25 to port hydraulic valve actuating line 29 to the pressure of fuel tank 11 (inlet pressure of engine fuel pump 15), so that hydraulic slide valve 28 is returned to a fully open position.

A consequence of all the foregoing adaptations is that the role of hydraulic pump-motor 21 is also reversed, and it has an unobstructed flow path 27 through which to deliver hydraulic fluid from hydraulic fluid reservoir 13 to servo valve 14. Fuel pump-motor 17 operated as a motor drives hydraulic pump-motor 21 as a hydraulic pump. During these just-described conditions, engine fuel pump 15 will deliver fuel to the engine combustor inlet 12 through an initial portion of fuel flow path 16 and a second fuel flow path 37 past check valve 18.

In operation, the slide valves 23 and 28 are shown in the shutdown or initial engine start-up mode. The hydraulic slide valve 28 allows hydraulic fluid flow from hydraulic pump 20 to gear type hydraulic pump-motor 21 as shown in FIG. 2. Fuel slide valve 23 allows the relatively low pressure fuel from engine fuel pump 15 to flow to gear-type fuel pump-motor 17. Fuel pump-motor 17 operating in the pump mode is driven by hydraulic pump-motor 21 operating in its motor mode and increases the fuel pressure and delivers it to engine combustor inlet 12. As the engine accelerates and engine fuel pump 15 gains pressurizing capability, the fluid pressure in hydraulic valve actuating line 29 modulates hydraulic slide valve 28 toward an increasingly closed condition, so that the drive power to hydraulic pump-motor 21 is reduced, and a nominal fuel pressure is maintained. It can also be seen, that if engine fuel pressure is low at normal engine speeds, indicative of a engine pump failure, the above described pumping mode would provide backup fuel pump action. With hydraulic pressure equal to about three times fuel pressure, the gear type fuel pump-motor 17 would deliver approximately three times the fuel flow versus the hydraulic fluid flow used at the gear type hydraulic pump-motor 21. This provides the capability to size the hydraulic pump 20 and the gear type pump motors, 17 and 21, to provide "get home" capability for the aircraft.

If hydraulic pump 20 fails, solenoid valve 24 ports pressurized fuel from high pressure signal line 31 through fuel valve actuating line 32 to fuel slide valve 23, switching it stably to the right, and inverting the function of fuel pump-motor 17 to a motor driven by pressure of the fuel as shown in FIG. 3. As a result valve 28 is reopened because port 34 is closed and port 38 is opened to fuel tank 11 pressure. The function of hydraulic pump-motor 21 is inverted to a hydraulic pump, driven by the fuel pump-motor 17. Fuel pump-motor 17 and hydraulic pump-motor 21 thus replaces hydraulic pump 20. This type of reversed function as between the two isolated fluid flow systems demonstrates the versatility of the invention. This provides enhanced start-up capability[, a backup fuel pump] as well as providing for a failure mode in the hydraulic system, and does so primarily with the addition of two gear-type pump motors, which are fully reversible in function.

A pressure ratio between the two systems is illustratively maintainable, e.g., 1,000 p.s.i. in the fuel side of the bifurcated isolated system and 3,000 p.s.i. on the hydraulic fluid side of the bifurcated system. The hydraulic fluid pressure tends to be self-limiting because the torque of the fuel motor is limited by the fuel pressure and so needs few or no additional valves.

Various modifications of the foregoing embodiment are clearly feasible within its teachings and scope. For example, some servo valves could be employed on the fuel side of the bifurcated system, thus providing them protection of a larger reservoir against fluid leaks, without compromising the isolation of the two systems. Gear type pumps are readily converted to motors but this could also be done with vane or piston pumps.

The foregoing specification sets forth the invention in its preferred embodiment and practical forms but the structure shown is capable of modification within a range of equivalents without departing from the spirit and scope of the invention which is to be understood is broadly novel as is commensurate with the appended claims.

I claim:

1. A gas turbine engine fuel and hydraulic fluid pumping apparatus comprising:
   a fuel circuit and a hydraulic fluid circuit isolated from said fuel circuit.
   a first means for pressurizing the fuel in said fuel circuit and a first means for pressurizing the hydraulic fluid in said hydraulic fluid circuit.
   a second means for pressurizing the fuel in said fuel circuit and a second means for pressurizing the hydraulic fluid in said hydraulic fluid circuit.
   wherein said second means for pressurizing the fuel and hydraulic fluid in their respective circuits include fuel and hydraulic fluid reversible pump-motors in their respective circuits, means for switching said pump-motors to their pump or motor modes, and means to drive one of said pump-motors in its pump mode by other of said pump-motors in its motor mode.
   wherein said means for switching said pump-motors to their pump and motor modes includes a hydraulic slide valve interposed in said hydraulic fluid circuit between said first and second means for pressurizing the hydraulic fluid.

2. The apparatus of claim 1 wherein said means for switching said pump-motors to their pump or motor modes includes a hydraulic slide valve actuation means responsive to a pressure in said fuel circuit.

3. The apparatus of claim 1 wherein said means for switching said pump-motors to their pump or motor modes included a fuel slide valve actuation means responsive to a pressure in said fuel circuit.

4. The apparatus of claim 1 wherein said means for switching said pump-motors to their pump or motor modes includes a fuel slide valve actuation means and a hydraulic slide valve actuation means responsive to a pressure failure signal generated by a pump failure signal generating means.

5. The apparatus of claim 4 wherein said a first means for pressurizing the fuel and said first means for pressurizing the hydraulic fluid are driven by the engine through an engine gearbox.

* * * * *